(12) United States Patent
Sakai

(10) Patent No.: US 11,622,277 B2
(45) Date of Patent: Apr. 4, 2023

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 16/313,436

(22) PCT Filed: Jun. 26, 2017

(86) PCT No.: PCT/JP2017/023335
§ 371 (c)(1),
(2) Date: Dec. 26, 2018

(87) PCT Pub. No.: WO2018/003722
PCT Pub. Date: Jan. 4, 2018

(65) Prior Publication Data
US 2019/0320317 A1 Oct. 17, 2019

(30) Foreign Application Priority Data
Jun. 30, 2016 (JP) .............................. JP2016-130611

(51) Int. Cl.
*H04L 29/06* (2006.01)
*H04W 12/77* (2021.01)
(Continued)

(52) U.S. Cl.
CPC .............. *H04W 12/77* (2021.01); *H04L 9/14* (2013.01); *H04W 12/0431* (2021.01); *H04W 12/50* (2021.01); *H04W 76/14* (2018.02)

(58) Field of Classification Search
CPC ..... H04W 12/00522; H04W 12/04031; H04W 12/003; H04W 76/14; H04W 84/12;
(Continued)

(56) References Cited

U.S. PATENT DOCUMENTS

2011/0282989 A1* 11/2011 Geirhofer ............. H04W 8/005
709/224
2012/0134349 A1* 5/2012 Jung ..................... H04W 8/005
370/338
(Continued)

FOREIGN PATENT DOCUMENTS

CA       2929173 A1    5/2015
CN     104640058 A     5/2015
(Continued)

OTHER PUBLICATIONS

Wi-Fi Peer-to-Peer (P2P) Technical Specification, Wi-Fi Alliance Technical Committee P2P Task Group, 2010,159 pages,Version 1.2, Wi Fi Alliance.

*Primary Examiner* — John B King
(74) *Attorney, Agent, or Firm* — Canon U.S.A., Inc. IP Division

(57) ABSTRACT

A communication apparatus reads an image relating to a first other communication apparatus and acquires information on the first other communication apparatus from the image. The communication apparatus reads an image relating to a second other communication apparatus and acquires information on the second other communication apparatus from
(Continued)

the image. The communication apparatus transmits information on a communication channel to the first other communication apparatus. The communication channel is for use in a role determination process for determining roles of the first other communication apparatus and the second other communication apparatus in direct wireless communication. The communication apparatus transmits the information on the communication channel and the information on the first other communication apparatus to the second other communication apparatus.

20 Claims, 6 Drawing Sheets

(51) Int. Cl.
*H04W 76/14* (2018.01)
*H04L 9/14* (2006.01)
*H04W 12/50* (2021.01)
*H04W 12/0431* (2021.01)

(58) Field of Classification Search
CPC ........... H04W 12/00305; H04W 12/04; H04W 48/08; H04L 9/14; G06K 7/1404; G06K 19/06009
See application file for complete search history.

(56) References Cited

U.S. PATENT DOCUMENTS

| | | | | |
|---|---|---|---|---|
| 2012/0158981 | A1* | 6/2012 | Desai | H04W 76/12 |
| | | | | 709/230 |
| 2013/0050259 | A1 | 2/2013 | Ahn et al. | |
| 2013/0063758 | A1* | 3/2013 | Saito | G06K 15/00 |
| | | | | 358/1.14 |
| 2013/0065627 | A1* | 3/2013 | Jung | H04W 52/0241 |
| | | | | 455/515 |
| 2014/0068719 | A1* | 3/2014 | Kiukkonen | H04W 12/003 |
| | | | | 726/4 |
| 2015/0131642 | A1* | 5/2015 | Amano | H04W 12/50 |
| | | | | 370/338 |
| 2015/0358820 | A1 | 12/2015 | Li et al. | |
| 2016/0234742 | A1* | 8/2016 | Takahashi | H04W 36/14 |
| 2018/0213585 | A1* | 7/2018 | Moritomo | H04W 76/15 |

FOREIGN PATENT DOCUMENTS

| | | | | |
|---|---|---|---|---|
| CN | 105557022 A | | 5/2016 | |
| EP | 2323460 A2 * | | 5/2011 | ............ H04W 76/10 |
| EP | 2963959 A1 | | 1/2016 | |
| JP | 2013062686 A | | 4/2013 | |
| JP | 2014-60623 A | | 4/2014 | |
| JP | 2014127871 A | | 7/2014 | |
| KR | 20130115722 A * | | 10/2013 | ............ H04W 76/36 |
| WO | WO-2015002385 A1 * | | 1/2015 | ............ H04W 28/18 |

* cited by examiner

[Fig. 1]
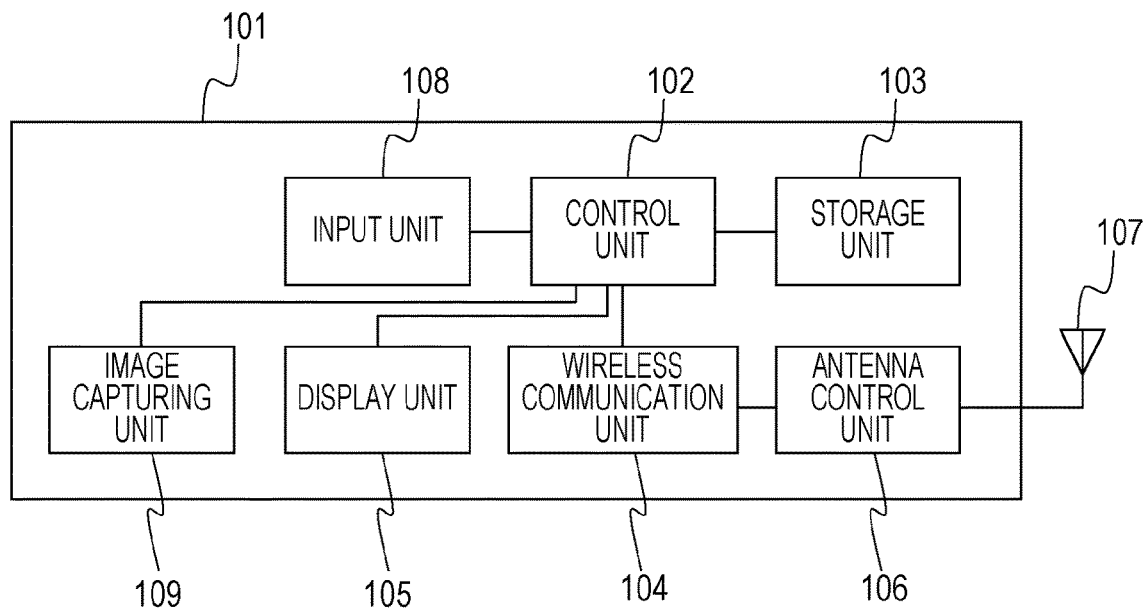
[Fig. 2]
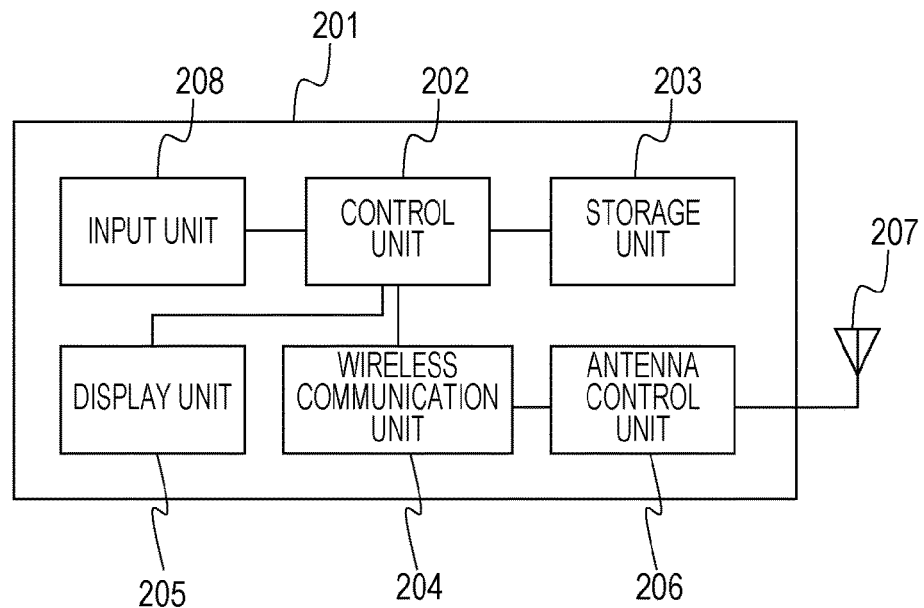

[Fig. 3]
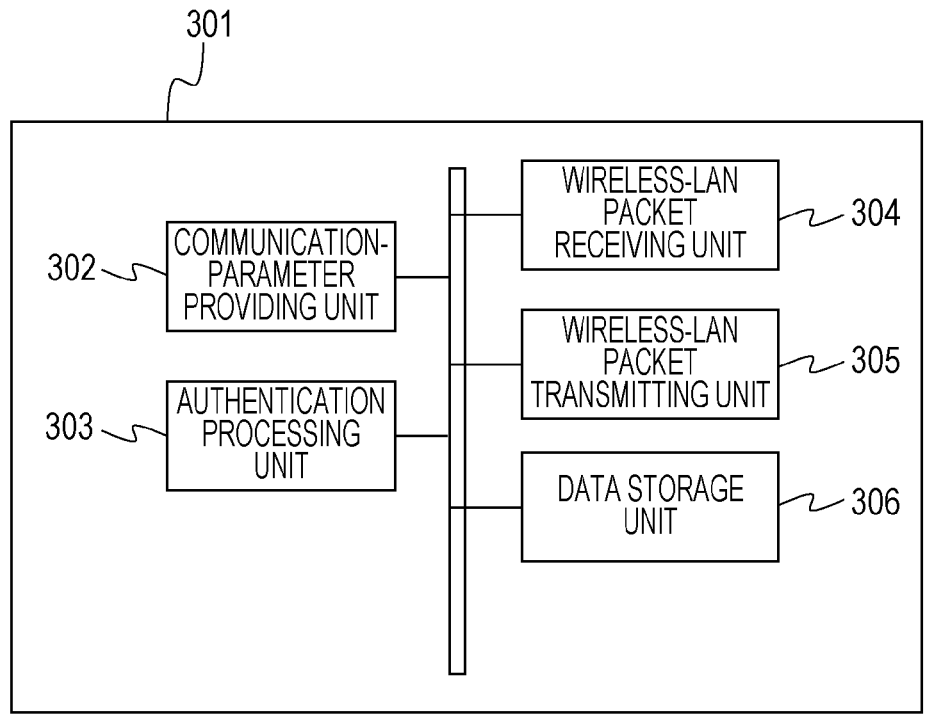
[Fig. 4]
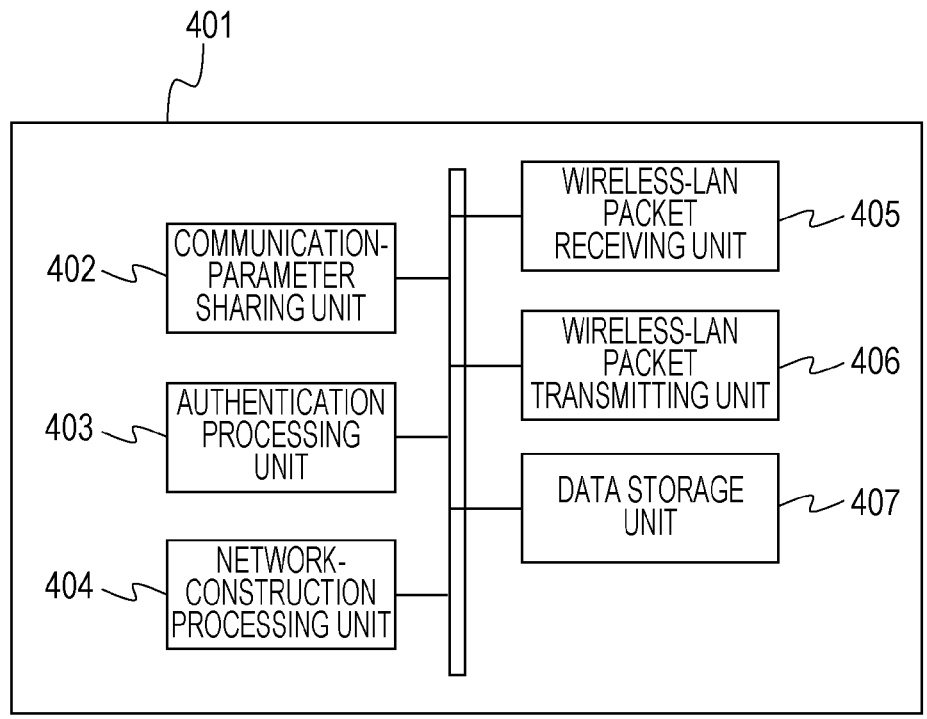

[Fig. 5]
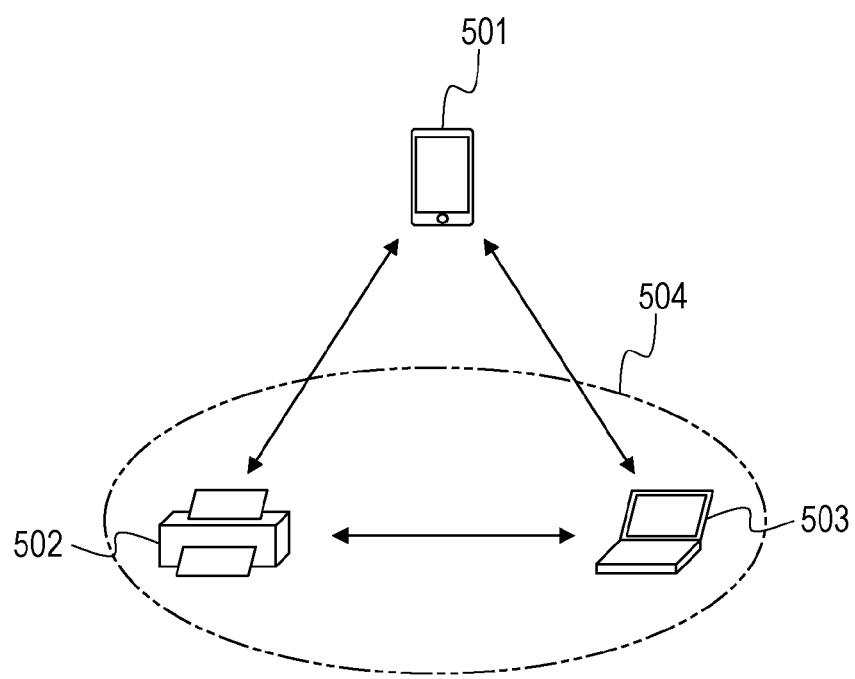

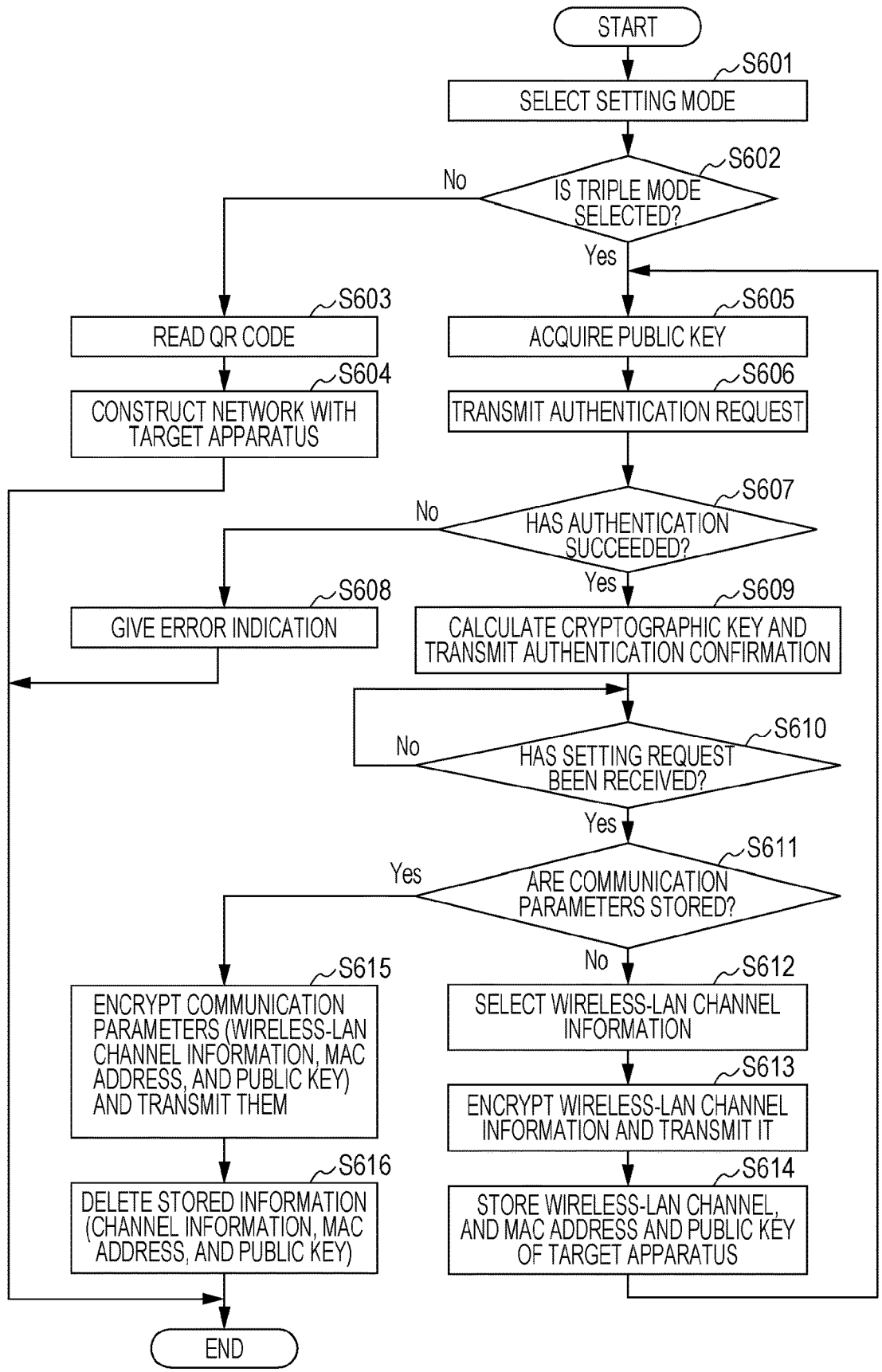

[Fig. 7]
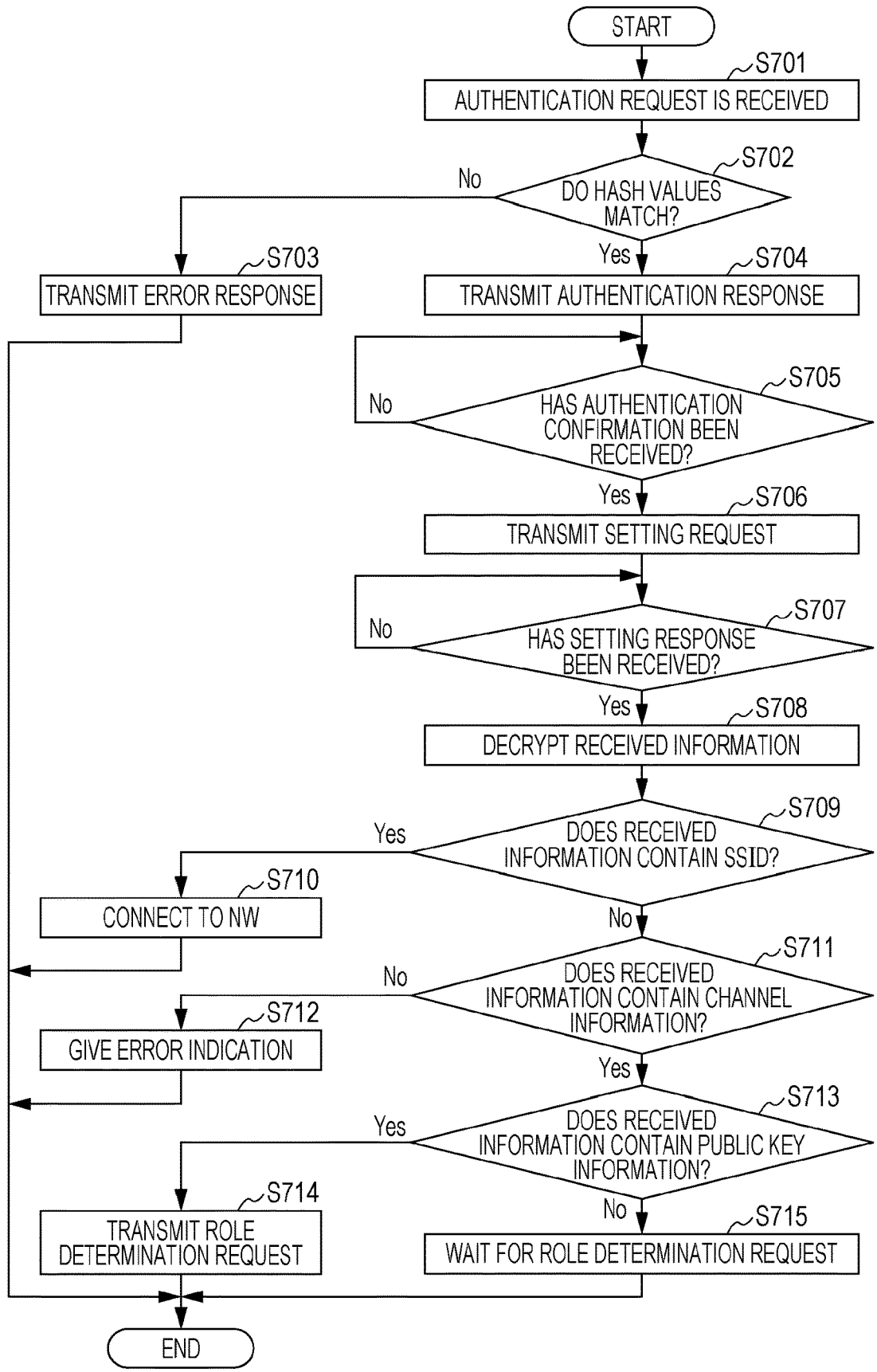

[Fig. 8]
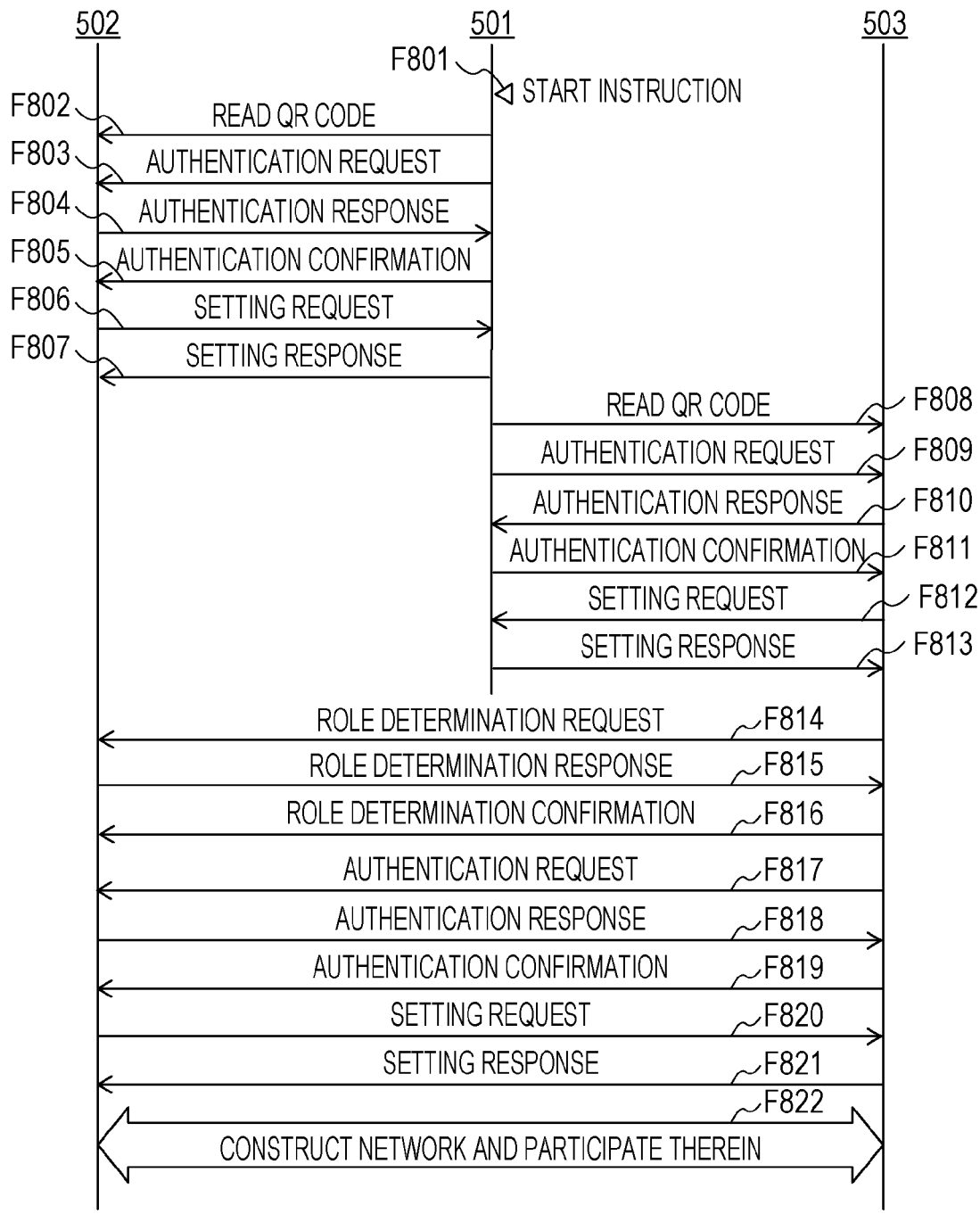

COMMUNICATION APPARATUS, COMMUNICATION METHOD, AND STORAGE MEDIUM

CROSS-REFERENCE TO RELATED APPLICATIONS

This application is the National Phase application of PCT Application No. PCT/JP2017/023335, filed on Jun. 26, 2017, and claims the benefit of Japanese Patent Application No. 2016-130611, filed Jun. 30, 2016, which applications are hereby incorporated by reference herein in their entireties.

TECHNICAL FIELD

The present disclosure relates to a communication technique.

BACKGROUND ART

Wi-Fi Direct (a registered trademark, hereinafter omitted) which defines specifications for achieving direct wireless communication between terminals using a terminal equipped with a base station function is standardized in Wi-Fi Alliance, which is an industry organization of wireless LAN.

Wi-Fi Direct defines a method for determining the role of operating as a base station, a method for setting parameters for connecting to a device serving as the base station, and a method of connection among terminals conforming to the standard.

Wi-Fi Direct defines a terminal device serving as the base station as P2P (peer-to-peer) GO (group owner), and a terminal device connected to the P2P GO as a P2P client. In the process of determining P2P GO (hereinafter referred to as a GO determination process), Intent values indicating the priority of P2P GO are exchanged between the terminals to determine a device serving as P2P GO. A device determined as P2P GO starts a base station function to construct a wireless LAN, and a device determines as the P2P Client acquires wireless parameters from the P2P GO to connect to the wireless LAN.

PTL 1 discloses facilitating a communication setting process using a mechanism for setting wireless LAN parameters or the like by means of a QR code (a registered trademark, hereinafter omitted).

Using the method disclosed in PTL 1 facilitates direct communication between terminal devices using Wi-Fi Direct or the like. However, using the method disclosed in J PTL 1 requires that at least one of the devices has the function of reading the QR code. Therefore, devices that do not have the reading function cannot use the setting process using the QR code. Furthermore, in the case where both devices are fixedly set, the devices cannot be moved to read the QR code. Also in that case, the setting process using the QR code cannot be used.

CITATION LIST

Patent Literature

PTL 1: Japanese Patent Laid-Open No. 2014-60623

SUMMARY OF INVENTION

The present disclosure allows devices incapable of executing a necessary reading function to directly communicate with each other wirelessly.

A communication apparatus according to a first aspect of the present disclosure includes a first reading unit, a first acquisition unit, a second reading unit, a second acquisition unit, a first transmitting unit, and a second transmitting unit. The first reading unit is configured to read an image relating to a first other communication apparatus. The first acquisition unit is configured to acquire information on the first other communication apparatus from the image read by the first reading unit. The second reading unit is configured to read an image relating to a second other communication apparatus. The second acquisition unit is configured to acquire information on the second other communication apparatus from the image read by the second reading unit. The first transmitting unit is configured to transmit information on a communication channel to the first other communication apparatus. The communication channel is for use in a role determination process for determining roles of the first other communication apparatus and the second other communication apparatus in direct wireless communication. The second transmitting unit is configured to transmit the information on the communication channel transmitted by the first transmitting unit and the information on the first other communication apparatus acquired by the first acquisition unit to the second other communication apparatus.

A communication apparatus according to second aspect of the present disclosure includes a receiving unit, a transmitting unit, and a waiting unit. The receiving unit is configured to receive setting information from an apparatus that reads an image relating to the communication apparatus. The setting information contains information on a communication channel for use in a role determination process for determining roles of the communication apparatus and another communication apparatus in wireless direct communication. The transmitting unit is configured, when the setting information received by the receiving unit contains information on the other communication apparatus, to transmit a request to start the role determination process containing the information over the communication channel. The waiting unit is configured, when the setting information received by the receiving unit does not contain the information on the other communication apparatus, to wait for a request to start the role determination process transmitted over the communication channel.

Further features of the present invention will become apparent from the following description of exemplary embodiments with reference to the attached drawings.

BRIEF DESCRIPTION OF DRAWINGS

FIG. 1 is a hardware block diagram of a setting apparatus according to an embodiment of the present disclosure.

FIG. 2 is a hardware block diagram of a communication apparatus according to an embodiment of the present disclosure.

FIG. 3 is a software functional block diagram of the setting apparatus.

FIG. 4 is a software functional block diagram of the communication apparatus.

FIG. 5 is a diagram illustrating a network configuration according to an embodiment of the present disclosure.

FIG. 6 is a flowchart illustrating the operation of the setting apparatus according to the present embodiment.

FIG. 7 is a flowchart illustrating the operation of the communication apparatus according to the present embodiment.

FIG. 8 is a diagram illustrating the operational sequence among the setting apparatus and the communication apparatuses according to the present embodiment.

DESCRIPTION OF EMBODIMENTS

A communication apparatus according to embodiments of the present disclosure will be described in detail hereinbelow with reference to the drawings. Although the following is an example in which a wireless LAN system conforming to Institute of Electrical and Electronics Engineers, Inc. (IEEE) 802.11 series is used, communication configuration is not limited to the wireless LAN conforming to IEEE 802.11. It is to be understood that the technical scope of the present disclosure is determined by the claims and is not limited to the following individual embodiments.

FIG. 1 is a hardware block diagram illustrating an example of the configuration of a setting apparatus, to be described later, according to one embodiment. Reference sign 101 denotes the whole apparatus. A control unit 102 is used to control the whole apparatus 101 by executing a control program stored in a storage unit 103. The control unit 102 includes, for example, one or more central processing units (CPUs). The control unit 102 also performs setting control of communication parameters with another apparatus. The storage unit 103 stores the control program to be executed by the control unit 102 and various information, such as communication parameters. Various operations to be described later are performed by the control unit 102 executing the control program stored in the storage unit 103. The storage unit 103 is a storage medium, such as a read-only memory (ROM), a random-access memory (RAM), a hard disk drive (HDD), a flash memory, or a detachable SD card.

A wireless communication unit 104 is used to perform wireless communication, such as a wireless LAN conforming to the IEEE 802.11 series. The wireless communication unit 104 includes a wireless communication chip. One example of the wireless communication is a short-distance wireless communication, such as Near Field Communication (a registered trademark, hereinafter referred to as NFC). A display unit 105 is used to present various indications. The display unit 105 has a function capable of outputting visually recognizable information, like a liquid crystal display (LCD) and a light-emitting diode (LED), and outputting sound, like a speaker. The display unit 105 has the function of outputting at least one of visual information and sound information. The display of a QR code is also performed by the display unit 105. In addition to the display by means of the display unit 105, the QR code may also be bonded to the casing of the communication apparatus in the form of a seal or bonded to an instruction manual or the cardboard package of the communication apparatus at the time of delivery. Reference sign 106 denotes a wireless-LAN-antenna control unit, and reference sign 107 denotes a wireless LAN antenna. An input unit 108 is used by the user to operate the setting apparatus by making various inputs or the like. An image capturing unit 109 serves as a reading unit that reads a QR code or the like by image capture.

FIG. 2 is a hardware block diagram illustrating an example of the configuration of a communication apparatus, to be described later, according to the present embodiment. Reference sign 201 denotes the whole apparatus. A control unit 202 is used to control the whole apparatus 201 by executing a control program stored in a storage unit 203. The control unit 202 includes, for example, one or more central processing units (CPUs). The control unit 202 also performs setting control of communication parameters with another apparatus. The storage unit 203 stores the control program to be executed by the control unit 102 and various information, such as communication parameters. Various operations to be described later are performed by the control unit 202 executing the control program stored in the storage unit 203. The storage unit 203 is a storage medium, such as a ROM, a RAM, a HDD, a flash memory, or a detachable SD card.

A wireless communication unit 204 is used to perform wireless communication, such as a wireless LAN conforming to the IEEE 802.11 series. The wireless communication unit 204 includes a wireless communication chip. One example of the wireless communication is a short-distance wireless communication, such as NFC. A display unit 205 is used to present various indications. The display unit 105 has a function capable of outputting visually recognizable information, like an LCD and an LED, and outputting sound, like a speaker. The display unit 205 has the function of outputting at least one of visual information and sound information. The display of a QR code is also performed by the display unit 205. In addition to the display by means of the display unit 205, the QR code may also be bonded to the casing of the communication apparatus in the form of a seal or bonded to an instruction manual or the cardboard package of the communication apparatus at the time of delivery. Reference sign 206 denotes a wireless-LAN-antenna control unit, and reference sign 207 denotes a wireless LAN antenna. An input unit 208 is used by the user to operate the communication apparatus by making various inputs or the like. The configuration illustrated in FIG. 2 is given for illustration, and the communication apparatus may have another hardware configuration. For example, in the case where the communication apparatus is a printer, the communication apparatus may include a printing unit in addition to the configuration illustrated in FIG. 2. In the case where the communication apparatus is a camera, the communication apparatus may include an image capturing unit.

FIG. 3 is a block diagram illustrating the configuration of a software functional block of the setting apparatus that executes a communication setting function, to be described later, according to an embodiment of the present disclosure. In the present embodiment, each function of the setting apparatus is stored as a program in the storage unit 103, and the function is implemented by the control unit 102 executing the program. The control unit 102 implements each function by controlling each hardware and calculating or processing information according to the control program. Part or all of the functional blocks may be implemented by hardware. In this case, the part or all of the functional blocks is constituted of, for example, an application specific integrated circuit (ASIC).

Reference sign 301 denotes the entire software functional block. Reference sign 302 denotes a communication-parameter providing unit. The setting apparatus serves as a communication-parameter providing source and generates and encodes communication parameters and provides the communication parameters to a target apparatus. The parameter providing process, to be described later, is performed by the communication-parameter providing unit 302. An authentication processing unit 303 performs authentication of the target apparatus using a QR code information or the like that the setting apparatus acquires. An authentication process to be performed by the setting apparatus (to be described later) is performed by the authentication processing unit 303. A wireless-LAN packet receiving unit 304 and a wireless-LAN packet transmitting unit 305 are used to perform wireless LAN communication conforming to the IEEE802.11 standard with the target apparatus. A data storage unit 306 is used to store the software itself, wireless LAN parameters, authentication information, barcodes, and other information. The functional block is illustrative only. A plurality of functional blocks may constitute one functional block or any of the functional blocks may be divided into a plurality of functional blocks.

FIG. 4 is a block diagram illustrating the configuration of a software functional block of the communication apparatus that executes a communication setting function, to be described later, according to an embodiment. In the present embodiment, each function of the communication apparatus is stored as a program in the storage unit 203, and the function is implemented by the control unit 202 executing the program. The control unit 202 implements each function by controlling each hardware and calculating or processing information according to the control program. Part or all of the functional blocks may be implemented by hardware. In this case, the part or all of the functional blocks is constituted of, for example, an ASIC.

Reference sign 401 denotes the entire software functional block. A communication-parameter sharing unit 402 performs a communication-parameter providing process, a communication-parameter receiving process, a communication-parameter encrypting process, an encrypted-communication-parameter decrypting process, and so on. The parameter providing process and the parameter receiving process, to be described later, are performed by the communication-parameter sharing unit 402. An authentication processing unit 403 performs authentication of the target apparatus using QR code information or the like contained in a received message. The authentication process to be performed by the setting apparatus (to be described later) is performed by the authentication processing unit 403. A network-construction processing unit 404 is used to construct or participating in a wireless LAN network using the received communication parameters. The network constructing process and the network participating process (to be described later) are performed by the network-construction processing unit 404. A wireless-LAN packet receiving unit 405 and a wireless-LAN packet transmitting unit 406 are used to perform wireless LAN communication conforming to the IEEE802.11 standard with the target apparatus. A data storage unit 407 is used to store the software itself, wireless LAN parameters, authentication information, barcodes, and other information. The functional block is illustrative only. A plurality of functional blocks may constitute one functional block or any of the functional blocks may be divided into a plurality of functional blocks. FIG. 5 illustrates a system configuration according to the present embodiment illustrating a smartphone 501, a printer 502, a notebook personal computer (PC) 503, and a wireless LAN 504 (hereinafter referred to as "network 504").

In the present embodiment, the smartphone 501 reads the QR codes of the printer 502 and the notebook PC 503, which are communication apparatuses, as the setting apparatus and provides information necessary for a GO determination process to each communication apparatus. The printer 502 and the notebook PC 503 each perform a GO determination process on the basis of the information received from the smartphone 501 to construct the network 504 on the basis of a determined role. The printer 502 and the notebook PC 503 start direct communication over a wireless LAN. The smartphone 501 is an example of the setting apparatus. The setting apparatus may be another apparatus. Examples include printers, cameras, PCs, digital TVs, various digital consumer electronics, and wearable devices. Also the printer 502 and the notebook PC 503 are examples of the communication apparatus. The communication apparatus may be another apparatus. Examples include printers, cameras, PCs, digital TVs, various digital consumer electronics, and wearable devices. The setting apparatus is one kind of communication apparatus. However, in the present embodiment, an apparatus having a QR-code reading function is referred to as "setting apparatus" to distinguish it from a communication apparatus having no QR-code reading function.

In the present embodiment, the smartphone 501 serving as the setting apparatus has the configurations in FIG. 1 and FIG. 3 described above. The printer 502 and the notebook PC 503 serving as communication apparatuses have the configurations in FIG. 2 and FIG. 4 described above.

FIG. 6 is a flowchart illustrating a process performed by the smartphone 501. The process in FIG. 6 is started by the control unit 102 when an instruction to start the process is given by user operation via the display unit 105 and the input unit 108. The steps in FIG. 6 are performed by the control unit 102 reading and executing the computer program stored in the storage unit 103.

After the process is started, the smartphone 501 prompts the user to determine whether to carry on the process in "double mode" or in "triple mode" via the display unit 105 and the input unit 108 (S601). The "double mode" is a mode for the smartphone 501 to construct a network between the smartphone 501 and another communication apparatus. The "triple mode" is a mode for the smartphone 501 to construct a network between the smartphone 501 and two communication apparatuses, that is, a first another communication apparatus and a second another communication apparatus.

The smartphone 501 determines which mode is selected, and if the double mode is selected (S602: No), reads the QR code of the target apparatus that constructs the network together with the smartphone 501 (S603). The smartphone 501 then performs a process for sharing communication parameters with the target apparatus using information acquired from the read QR code and thereafter constructs a network together with the target apparatus (S604).

The QR code that the smartphone 501 read at S603 may contain information necessary for constructing the network, such as a service set identifier (SSID) and a cryptographic key. The smartphone 501 may construct the network using the information, such as SSID, acquired from the read QR code. The QR code that the smartphone 501 read at S603 may contain public key information, and the smartphone 501 may share the communication parameters with the target apparatus by public key cryptography using the public key. Furthermore, when the double mode is selected, the smartphone 501 may construct the wireless network by performing Wi-Fi Direct with the target apparatus.

If in the determination at S602, the triple mode is selected (S602: Yes), the smartphone 501 reads the QR code of another communication apparatus (for example, the printer 502). Then, the smartphone 501 acquires information on a public key contained in the read QR code (S605). The information on the public key is one example of information on the other communication apparatus. The information may not be the public key information but may be identification information, such as address information on or a universally unique identifier (UUID) of the other communication apparatus. After acquiring the public key information, the smartphone 501 calculates the hash value of the acquired public key information and transmits an authentication request containing the hash value to the other communication apparatus (S606). When the address of the other communication apparatus is specified from the read QR code, the smartphone 501 may transmit the authentication request by unicast by specifying the address. When the address of the other communication apparatus cannot be specified, the smartphone 501 may transmit the authentication request by broadcasting.

If the authentication request contains a correct hash value, so that the authentication process has succeeded, then the smartphone 501 receives an authentication response indicating that the authentication has succeeded from the other communication apparatus (S607: Yes). If the authentication process has failed such as when an incorrect hash value is contained, the smartphone 501 receives an authentication response indicating that authentication has failed from the other communication apparatus (S607: No). If there is no response to the authentication request for a fixed time, then the smartphone 501 determines that the authentication process has failed. In that case, the smartphone 501 presents an error indication on the display unit 105 to notify the user of the fail in processing and terminates the process (S608).

If the smartphone 501 has received the authentication response indicating that the authentication has succeeded (S607: Yes), the smartphone 501 calculates a cryptographic key by public key cryptography and transmits an authentication confirmation to the other communication apparatus (S609). The smartphone 501 and the other communication apparatus enter a state of sharing a shared key for use in subsequent encryption processing. After the transmission, the smartphone 501 waits for a setting request transmitted from the other communication apparatus (S610).

If the smartphone 501 has received the setting request (S610: Yes), the smartphone 501 checks the data storage unit 306 to determine whether communication parameters to be stored at step S614 (to be described later) are stored (S611). If the communication parameters are not stored (S611: No), the smartphone 501 selects a communication channel to be used by the other communication apparatus in a GO determination process as a communication parameter to be transmitted to the other communication apparatus (S612). The GO determination process is a role determination process for determining which of the apparatuses that execute Wi-Fi Direct serves as GO and which serves as CL, that is, Group Owner Negotiation defined in Wi-Fi Direct. The GO determination process is one example of the role determination process for determining the roles of the first other communication apparatus and the second other communication apparatus in direct communication by radio. The roles defined in the role determination process are not limited to GO and CL in Wi-Fi Direct but may be a role as a provider that provides communication parameters and a role as a receiver. Alternatively, the roles may be a role as a construction apparatus that participates in the wireless LAN, like an access point of a wireless LAN, and a role as a participating apparatus participating the constructed wireless LAN. At S612, the smartphone 501 may select the communication channel from all available channels or from predetermined communication channels. For example, the smartphone 501 may select any communication channel from a first to 11th channels available in a wireless LAN in a 2.4 GHz band. Alternatively, the smartphone 501 may select any communication channel from a first, sixth, and 11th channels defined as social channels in Wi-Fi Direct.

After selecting the communication channel, the smartphone 501 encrypts the communication parameters using the cryptographic key calculated at S609. The smartphone 501 incorporates the encrypted communication parameters in a setting response and transmits the response to the other communication apparatus (S613). The communication parameters transmitted at that time include at least information on the communication channel selected at S612.

After transmitting the setting response, the smartphone 501 stores the information on the selected communication channel, the media access control address (MAC) address of the other communication apparatus, and the acquired public key information in the storage unit 306 (S614).

After the storage, the smartphone 501 returns to the state in which the QR code can be photographed again to transmit the information stored at S614 to a further apparatus (for example, the notebook PC 503, hereinafter referred to as "second other communication apparatus") (returns to S605). After storing the information at S614, the smartphone 501 may present an indication prompting the user to take a picture of the QR code of the second other communication apparatus on the display unit 105.

When the QR code of the second other communication apparatus is read by the smartphone 501, the process from S605 to S611 described above is executed. If at S611 it is determined that the communication parameters are stored in the storage unit 306 (S611: Yes). The smartphone 501 reads the communication channel information, the MAC address of the second other communication apparatus, and the public key information stored in the data storage unit 306 and encrypts them (S615). The smartphone 501 incorporates the encrypted communication parameters in a setting response and transmits the setting response to the second other communication apparatus (S615). The communication parameters transmitted at that time include at least information on the communication channel selected at S612, information on the second other communication apparatus (for example, the address information on the second other communication apparatus and public key information).

After the transmission, the smartphone 501 deletes the communication channel information, the MAC address of the second other communication apparatus, and the public key information stored in the data storage unit 306 and terminates the process (S616).

At S616, the smartphone 501 may delete the stored information on the condition that the setting response is transmitted to a predetermined number of other communication apparatuses. This allows, even if three or more communication apparatuses participate in the network 504, the GO determination process to be promptly performed among the participating communication apparatuses.

FIG. 7 is a flowchart illustrating a process performed by the printer 502 or the notebook PC 503 (hereinafter referred to as "communication apparatus"). In the present embodiment, the process in FIG. 7 is started by the control unit 202 when the wireless LAN communication function of the communication apparatus is enabled, for example, at the timing when the apparatus is turned on. The process in FIG. 7 may be started by the control unit 202 when processing start is selected by user operation via the display unit 205 or the input unit 208. Alternatively, in the case of an apparatus having the function of displaying a QR code on a display unit, the process may be started when the QR code is displayed on the display unit. The process in FIG. 7 is performed by the control unit 202 reading and executing a computer program stored in the storage unit 203.

After the process is started, the communication apparatus waits for an authentication request transmitted from the setting apparatus (S701). When receiving the authentication request, the communication apparatus determines whether a hash value contained in the authentication request matches a hash value in the public key information of the communication apparatus (S702). If the hash values do not match (S702: No), the communication apparatus transmits an authentication response indicating that authentication has failed to the setting apparatus and terminates the process illustrated in FIG. 7 (S703). At S703, the communication apparatus may present an error indication on the display unit 205. At step S703, after transmitting the authentication response, the communication apparatus may not terminate the process and return to S701 to wait for an authentication request again. In that case, the repetitive process may be continued for a predetermined time. If the hash values match (S702: Yes), the communication apparatus transmits an authentication response indicating that the authentication has succeeded to the setting apparatus (S704) and waits for an authentication confirmation transmitted from the setting apparatus (S705).

If the communication apparatus has received the authentication confirmation (S705: Yes), the communication apparatus transmits a setting request to the setting apparatus (S706) and waits for a setting response (S707). If the communication apparatus has received the setting response (S707: Yes), the communication apparatus decrypts encrypted setting information contained in the setting response using a cryptographic key that the communication apparatus holds (S708). The communication apparatus checks the contents of the decrypted setting information to determine whether the setting information contains a network identifier (SSID) (S709). If the network identifier is contained (S709: Yes), the communication apparatus connects to a wireless LAN indicated by the network identifier contained in the setting information and terminates the process illustrated in FIG. 7 (S710). At S710, the communication apparatus may connect to the wireless LAN using a wireless LAN authentication method, an encryption method, or a cryptographic key contained in the decrypted setting information.

If the decrypted setting information does not contain the SSID (S709: No), then the communication apparatus determines whether the decrypted setting information contains information on a communication channel to be used in the GO determination process (S711).

If the decrypted setting information does not contain the information on the communication channel (S711: No), the communication apparatus presents an error indication on the display unit 205 and terminates the process illustrated in FIG. 7 (S712). If the decrypted setting information contain the information on the communication channel (S711: Yes), the communication apparatus determines whether the decrypted setting information further contains information on a public key and MAC address information on a second other communication apparatus (S713).

If the decrypted setting information contain public key information and MAC address information (S713: Yes), the communication apparatus starts the GO determination process and transmits a request to start a role determination process over the communication channel determined at S711 (S714). The start request to be transmitted here may be transmitted to the acquired MAC address by unicast. Alternatively, a start request containing the acquired public key information or a hash value thereof may be transmitted. This allows the second other apparatus that has received the start request to recognize that the apparatus that has transmitted the start request specifies the second other apparatus as a connection target.

If the decrypted setting information does not contain the public key information and the MAC address information (S713: No), then the communication apparatus starts the GO determination process and waits for a request to start the role determination process over the communication channel determined at S711 (S715). Afterwards, the communication apparatus executes a role determination process of Wi-Fi Direct with the other communication apparatus and performs direct communication over the wireless LAN.

FIG. 8 illustrates the sequence of a processing operation performed among the smartphone 501, the printer 502, and the notebook PC 503.

The smartphone 501 starts the process of the flowchart in FIG. 6 in response to a user instruction to start a registration process (F801). The smartphone 501 than reads the QR code of the printer 502 to acquire public key information on the printer 502 (F802). The smartphone 501 transmits an authentication request containing the hash value of the acquired public key information to the printer 502 (F803). Upon reception of the authentication request, the printer 502 performs the process of the flowchart in FIG. 7 to transmit an authentication response indicating that the authentication has succeeded (F804). Upon reception of the authentication response, the smartphone 501 transmits an authentication confirmation (F805). Then the smartphone 501 transmits a setting response containing information on a communication channel to be used in the GO determination process in response to the setting request (F806) received from the printer 502 (F807).

The printer 502 checks the details of the received setting response and waits for a role determination request from a target apparatus (in this case, the notebook PC 503) over the communication channel contained in the setting response (F807).

After transmitted the setting response at F807, the smartphone 501 reads the QR code of the notebook PC 503 to acquire public key information on the notebook PC 503 (F808). The smartphone 501 transmits an authentication request containing the hash value of the received public key information to the notebook PC 503 (F809). Upon reception of the authentication request, the notebook PC 503 executes the process of the flowchart in FIG. 7 and transmits an authentication response indicating that the authentication has succeeded (F810).

Upon reception of the authentication response, the smartphone 501 transmits an authentication confirmation (F811). The smartphone 501 transmits a setting response containing information on the communication channel to be used in the GO determination process and the MAC address and the public key information on the printer 502 in response to the setting request (F812) received from the notebook PC 503 (F813). The notebook PC 503 stores the received communication channel information and MAC address and public key information on the printer 502 in the data storage unit 407.

The notebook PC 503 checks the details of the received setting response and transmits a request to start the role determination process to the printer 502 over the communication channel contained in the setting response (F814). Upon reception of the request to start the role determination process, the printer 502 determines P2P GO on the basis of Intent value indicating the priority of P2P GO contained in the start request and transmits a role determination response to the notebook PC 503 (F815). In the present embodiment, the notebook PC 503 is determined as P2P GO.

After transmitting a role determination confirmation (F816), the notebook PC 503 calculates the hash value of the public key information on the printer 502 stored in the data storage unit 407 and transmits an authentication request including the hash value to the printer 502 (F817). Upon reception of the authentication request, the printer 502 transmits an authentication response indicating that authentication has succeeded (F818). Upon reception of the authentication response, the notebook PC 503 transmits an authentication confirmation (F819).

Afterwards, the notebook PC 503 incorporates communication parameters necessary for constructing the network 504 in a setting response and transmits the setting response to the printer 502 (F821) in response to the setting request received from the printer 502 (F820). The communication parameters transmitted here includes at least one of a SSID serving as a network identifier, a cryptographic key, an encryption method, an authentication key, and an authentication method. After transmitting the setting response, the notebook PC 503 constructs the network 504 as P2P GO on the basis of the transmitted communication parameters. The printer 502 participates in the network 504 as a P2P Client (F822).

As described above, the present embodiment allows the printer 502 and the notebook PC 503 to share the information on a communication channel over which the GO determination process is executed stably and promptly using the smartphone 501. This allows even apparatuses having no QR-code reading function to perform the GO determination process easier and faster than before, improving user convenience.

Other Embodiments

In the above embodiment, the notebook PC 503 may transmit the authentication request to be transmitted at F817 before transmitting the request to start the role determination process at F814. In that case, the notebook PC 503 may determine P2P GO by transmitting the request to start the role determination process after transmitting the authentication confirmation to be transmitted at F819. This enables the printer 502 to authenticate the notebook PC 503 by confirming that the hash values of the public key information match prior to the role determination process, further improving the security.

In the role determination process, the printer 502 may serve as P2P GO. In this case, the printer 502 may construct the network 504 on the basis of the communication parameters contained in the setting response transmitted at F821.

The above embodiment has been described as related to a configuration in which information for setting communication parameters is exchanged between apparatuses using photographed images of QR codes. Instead of photographing the QR codes, wireless communication, such as NFC or Bluetooth (a registered trademark), may be used. Alternatively, wireless communication, such as IEEE802.11ad or TransferJet (a registered trademark), maybe used.

In the above embodiment, the QR code is one example of an image read by the setting apparatus. The image to be read is not limited to the QR code but may be a one-dimensional barcode, a two-dimensional code other than the QR code, or another image.

In the above embodiment, the smartphone 501 may acquire the public key information using a photographed image of the QR code from the printer 502 and may acquire the public key information from the notebook PC 503 using a method other than the QR code (for example, NFC). This allows two apparatuses, even if they are not ready for a common wireless communication method other than wireless LAN communication, to perform the GO determination process via the smartphone 501 easier and faster than before.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-130611, filed Jun. 30, 2016, which is hereby incorporated by reference herein in its entirety.

The invention claimed is:

1. A communication apparatus comprising:
   one or more processors; and
   one or more memories storing instructions, when executed by the one or more processors, causing the communication apparatus to function as:
   a first reading unit configured to read an image relating to a first other communication apparatus;
   a first acquisition unit configured to acquire information on the first other communication apparatus from the image read by the first reading unit;
   a second reading unit configured to read an image relating to a second other communication apparatus;
   a second acquisition unit configured to acquire information on the second other communication apparatus from the image read by the second reading unit;
   a first transmitting unit configured to transmit, based on acquisition of information by the first acquisition unit, first information for identifying a frequency channel to be used in a role determination process to the first other communication apparatus; and
   a second transmitting unit configured to transmit, based on acquisition of information by the second acquisition unit, the first information transmitted by the first transmitting unit and the information on the first other communication apparatus acquired by the first acquisition unit to the second other communication apparatus, wherein the role determination process for determining roles of the first other communication apparatus and the second other communication apparatus in direct wireless communication is performed over the frequency channel identified by the first information, without search over a channel different from the identified frequency channel being performed.

2. The communication apparatus according to claim 1, wherein the information on the first other communication apparatus comprises information on a public key of the first other communication apparatus.

3. The communication apparatus according to claim 1, wherein the information on the first other communication apparatus comprises address information on the first other communication apparatus.

4. The communication apparatus according to claim 1, wherein the one or more memories storing instructions, when executed by the one or more processors, causes the communication apparatus to further function as a storage unit configured to store the first information and the information on the first other communication apparatus after the first transmitting unit transmits the first information to the first other communication apparatus.

5. The communication apparatus according to claim 4, wherein the one or more memories storing instructions, when executed by the one or more processors, causes the communication apparatus to further function as a deleting unit configured to delete the information stored by the storage unit after the second transmitting unit transmits the first information and the information on the first other communication apparatus.

6. A communication apparatus comprising:
one or more processors; and
one or more memories storing instructions, when executed by the one or more processors, causing the communication apparatus to function as:
a receiving unit configured to receive setting information from an apparatus that reads an image relating to the communication apparatus, the setting information containing first information for identifying a frequency channel to be used in a role determination process;
a transmitting unit configured, in a case where the setting information received by the receiving unit contains information on another communication apparatus, to transmit a request to start the role determination process over the frequency channel which is identified by the first information, the request containing the information on another communication apparatus; and
a waiting unit configured, in a case where the setting information received by the receiving unit does not contain the information on the other communication apparatus, to wait for the request to start the role determination process transmitted over the frequency channel which is identified by the first information,
wherein the role determination process including the transmission of the request and the waiting of the request for determining roles of the communication apparatus and the other communication apparatus in direct wireless communication is performed over the frequency channel which is identified by the first information, without search over a channel different from the frequency channel which is identified by the first information being performed.

7. The communication apparatus according to claim 6, wherein the one or more memories storing instructions, when executed by the one or more processors, causes the communication apparatus to further function as a connecting unit configured, when the setting information received by the receiving unit contains a network identifier, to connect to a wireless network identified by the network identifier.

8. The communication apparatus according to claim 6, wherein the information on the other communication apparatus comprises information on a public key of the other communication apparatus.

9. The communication apparatus according to claim 1, wherein the role determination process comprises Group Owner Negotiation defined in Wi-Fi Direct.

10. The communication apparatus according to claim 1, wherein the image is a barcode or a two-dimensional code.

11. A communication method comprising:
a first reading step of reading an image relating to a first communication apparatus;
a first acquisition step of acquiring information on the first communication apparatus from the image read at the first reading step;
a second reading step of reading an image relating to a second communication apparatus;
a second acquisition step of acquiring information on the second communication apparatus from the image read at the second reading step;
a first transmitting step of transmitting, based on acquisition of information by the first acquisition step, first information for identifying a frequency channel to be used in a role determination process to the first communication apparatus; and
a second transmitting step of transmitting, based on acquisition of information by the second acquisition step, the first information transmitted at the first transmitting step and the information on the first communication apparatus acquired at the first acquisition step to the second communication apparatus,
wherein the role determination process for determining roles of the first communication apparatus and the second communication apparatus in direct wireless communication is performed over the frequency channel identified by the first information, without search over a channel different from the identified frequency channel being performed.

12. A communication method comprising the steps of:
receiving setting information from an apparatus that reads an image relating to a communication apparatus, the setting information containing first information for identifying a frequency channel to be used in a role determination process;
in a case where the setting information received at the receiving step contains information on another communication apparatus, transmitting a request to start the role determination process over the frequency channel which is identified by the first information, the request containing the information on another communication apparatus; and
in a case where the setting information received at the receiving step does not contain the information on the other communication apparatus, waiting for the request to start the role determination process transmitted over the frequency channel which is identified by the first information,
wherein the role determination process including the transmission of the request and the waiting of the request for determining roles of the communication apparatus and the other communication apparatus in direct wireless communication is performed over the frequency channel which is identified by the first information, without search over a channel different from the frequency channel which is identified by the first information being performed.

13. The communication apparatus according to claim 6, wherein the role determination process comprises Group Owner Negotiation defined in Wi-Fi Direct.

14. The communication apparatus according to claim 6, wherein the image is a barcode or a two-dimensional code.

15. A non-transitory computer-readable storage medium storing a program for causing a communication apparatus to execute a communication method, the communication method comprising:
   a first reading step of reading an image relating to a first communication apparatus;
   a first acquisition step of acquiring information on the first communication apparatus from the image read at the first reading step;
   a second reading step of reading an image relating to a second communication apparatus;
   a second acquisition step of acquiring information on the second communication apparatus from the image read at the second reading step;
   a first transmitting step of transmitting, based on acquisition of information by the first acquisition step, first information for identifying a frequency channel to be used in a role determination process to the first communication apparatus; and
   a second transmitting step of transmitting, based on acquisition of information by the second acquisition step, the first information transmitted at the first transmitting step and the information on the first communication apparatus acquired at the first acquisition step to the second communication apparatus,
   wherein the role determination process for determining roles of the first communication apparatus and the second communication apparatus in direct wireless communication is performed over the frequency channel identified by the first information, without search over a channel different from the identified frequency channel being performed.

16. A non-transitory computer-readable storage medium storing a program for causing a communication apparatus to execute a communication method, the communication method comprising the step of:
   receiving setting information from an apparatus that reads an image relating to a communication apparatus, the setting information containing first information for identifying a frequency channel to be used in a role determination process;
   in a case where the setting information received at the receiving step contains information on another communication apparatus, transmitting a request to start the role determination process over the frequency channel which is identified by the first information, the request containing the information on another communication apparatus; and
   in a case where the setting information received at the receiving step does not contain the information on the other communication apparatus, waiting for the request to start the role determination process transmitted over the frequency channel which is identified by the first information,
   wherein the role determination process including the transmission of the request and the waiting of the request for determining roles of the communication apparatus and the other communication apparatus in direct wireless communication is performed over the frequency channel, without search over a channel different from the frequency channel which is identified by the first information being performed.

17. The communication apparatus according to claim 1, wherein the first other communication apparatus and the second other communication apparatus transmit or wait a request to start the role determination process over the frequency channel which is identified by the first information.

18. The communication apparatus according to claim 1, wherein, in the role determination process, Group Owner and Client in Wi-Fi Direct are determined.

19. The communication apparatus according to claim 1, wherein, in the role determination process, a providing apparatus for providing a communication parameter and a receiving apparatus for receiving the communication parameter are determined.

20. The communication apparatus according to claim 6, wherein, in the role determination process, Group Owner and Client in Wi-Fi Direct are determined.

* * * * *